United States Patent
Bertz et al.

(10) Patent No.: US 8,565,818 B1
(45) Date of Patent: Oct. 22, 2013

(54) BROADBAND WIRELESS ROUTER

(75) Inventors: Lyle T. Bertz, Lee's Summit, MO (US); Jeremy R. Breau, Leawood, KS (US); Jason R. Delker, Olathe, KS (US); Lars J. Hacking, Kansas City, MO (US); Eric E. Miller, Olathe, KS (US); Sei Y. Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 391 days.

(21) Appl. No.: 12/898,121

(22) Filed: Oct. 5, 2010

Related U.S. Application Data

(60) Provisional application No. 61/383,477, filed on Sep. 16, 2010.

(51) Int. Cl.
*H04B 1/38* (2006.01)
*H04B 7/00* (2006.01)
*H04M 1/00* (2006.01)
*H04M 3/42* (2006.01)
*H04W 40/00* (2009.01)

(52) U.S. Cl.
USPC ...... 455/557; 455/556.1; 455/41.2; 455/41.3; 455/445; 379/218.01

(58) Field of Classification Search
USPC .............. 455/445, 557, 556.1, 41.2, 41.3; 379/218.01
See application file for complete search history.

(56) References Cited

U.S. PATENT DOCUMENTS

| | | |
|---|---|---|
| 5,450,616 A | 9/1995 | Rom |
| 5,465,392 A | 11/1995 | Baptist et al. |
| 5,465,398 A | 11/1995 | Flammer |
| 5,553,076 A | 9/1996 | Behtash et al. |
| 5,553,316 A | 9/1996 | Diepstraten et al. |
| 5,560,021 A | 9/1996 | Vook et al. |
| 5,923,702 A | 7/1999 | Brenner et al. |
| 5,995,496 A | 11/1999 | Honkasalo et al. |
| 6,192,230 B1 | 2/2001 | Van Bokhorst et al. |
| 6,411,608 B2 | 6/2002 | Sharony |
| 6,430,193 B1 | 8/2002 | Raissinia et al. |
| 6,463,307 B1 | 10/2002 | Larsson et al. |
| 6,738,469 B1 * | 5/2004 | Peirce et al. ............. 379/218.01 |
| 6,842,605 B1 | 1/2005 | Lappeläinen et al. |
| 7,162,250 B2 | 1/2007 | Misra |
| 7,174,134 B2 | 2/2007 | Klein et al. |
| 7,236,470 B1 | 6/2007 | Bims |
| 7,324,785 B2 | 1/2008 | Hansen et al. |
| 7,336,634 B2 | 2/2008 | del Prado et al. |
| 7,400,901 B2 | 7/2008 | Kostic et al. |
| 8,285,208 B2 | 10/2012 | Terlizzi |
| 8,301,207 B2 * | 10/2012 | Oh ................................. 455/573 |
| 2004/0185902 A1 * | 9/2004 | Yang ............................ 455/557 |

(Continued)

OTHER PUBLICATIONS

Plamen Nedeltchev, "Wireless Local Area Networks and the 802.11 Standard," Mar. 31, 2001.

(Continued)

*Primary Examiner* — Opiribo Georgewill

(57) ABSTRACT

A communication device is provided. The communication device comprises a short range radio transceiver, a cellular radio transceiver, a speaker, and a microphone. The short range radio transceiver wirelessly receives dialed digits, the device establishes a voice call via the cellular radio transceiver based on the dialed digits, the cellular radio transceiver transmits voice received from the microphone, and the device presents voice received via the cellular radio transceiver over the speaker.

18 Claims, 5 Drawing Sheets

(56) References Cited

U.S. PATENT DOCUMENTS

| | | | |
|---|---|---|---|
| 2005/0128970 A1 | 6/2005 | Tsien et al. | |
| 2007/0004444 A1 | 1/2007 | Klein et al. | |
| 2007/0202884 A1* | 8/2007 | Nykanen et al. | 455/455 |
| 2008/0069316 A1* | 3/2008 | Walter et al. | 379/88.18 |
| 2009/0086953 A1* | 4/2009 | Vendrow | 379/207.02 |
| 2009/0270025 A1 | 10/2009 | Kossi et al. | |
| 2009/0325625 A1 | 12/2009 | Hugl et al. | |
| 2010/0099419 A1* | 4/2010 | Hanson et al. | 455/445 |
| 2010/0234051 A1 | 9/2010 | Holden et al. | |
| 2010/0285828 A1 | 11/2010 | Panian et al. | |
| 2011/0143723 A1* | 6/2011 | Shaw et al. | 455/413 |

OTHER PUBLICATIONS

Breeze Wireless Communications, Ltd., "IEEE 802.11 Technical Tutorial," 1998.
Bob O'Hara and Al Petrick, "The IEEE 802.11 Handbook: A Designer's Companion," 1999, pp. 88-93.
Office Action dated Oct. 10, 2007, U.S. Appl. No. 10/836,372, filed Apr. 30, 2004.
Final Office Action dated Apr. 17, 2008, U.S. Appl. No. 10/836,372, filed Apr. 30, 2004.
Office Action dated Sep. 8, 2008, U.S. Appl. No. 10/836,372, filed Apr. 30, 2004.
Final Office Action dated Mar. 17, 2009, U.S. Appl. No. 10/836,372, filed Apr. 30, 2004.
Advisory Action dated May 13, 2009, U.S. Appl. No. 10/836,372, filed Apr. 30, 2004.
Examiner's Answer dated Jul. 7, 2010, U.S. Appl. No. 10/836,372, filed Apr. 30, 2004.
Delker, Jason R., et al. "Method and System for Power Control in a Wireless LAN", filed Apr. 30, 2004, U.S. Appl. No. 10/836,372.
Delker, Jason R., et al., "Short Range Wireless Power Consumption Management", filed May 26, 2011, U.S. Appl. No. 13/116,864.
Wikipedia, "Ajax Programming", dated Jul. 6, 2010, http://en.wikipedia.org/w/index.php?title=Ajax_(programming)&printable=yes.
Pre-Interview Communication dated Mar. 27, 2013, U.S. Appl. No. 13/116,864, filed May 26, 2011.

* cited by examiner

BROADBAND WIRELESS ROUTER

CROSS-REFERENCE TO RELATED APPLICATIONS

This application claims priority to U.S. Provisional Application No. 61/383,477 filed Sep. 16, 2010, and entitled "Broadband Wireless Router," by Lyle T. Bertz, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Maturing mobile communication technologies hold out the promise of ubiquitous communications connectivity. This communications connectivity may provide both data communication service and voice communication service. As semiconductors achieve further miniaturization, multiple different radios may be embedded in the same consumer electronic devices.

SUMMARY

In an embodiment, a communication device is disclosed. The communication device comprises a short range radio transceiver, a cellular radio transceiver, a speaker, and a microphone. The short range radio transceiver receives dialed digits, the device establishes a voice call via the cellular radio transceiver based on the dialed digits, the device transmits voice received from the microphone via the cellular radio transceiver, and the device presents voice received via the cellular radio transceiver over the speaker.

In an embodiment, a method of communication is disclosed. The method comprises receiving dialed digits via a hyper text transfer protocol over a short range radio link, originating a first voice call via a cellular radio link based on the dialed digits, presenting voice received via the cellular radio link, and transmitting voice input received by a microphone.

In an embodiment, a communication system is disclosed. The communication system comprises a first electronic device and a second electronic device. The first electronic device comprises a first short range radio transceiver and an input device. The input device receives a designation of a phone number and the first short range radio transceiver transmits the phone number. The second electronic device comprises a second short range radio transceiver, a cellular radio transceiver, a speaker, a microphone, and a mechanical coupling. The second short range radio transceiver receives the phone number transmitted by the first short range radio transceiver, and the cellular radio transceiver transmits signaling to establish a phone call to the phone number. The speaker presents voice received by the cellular radio transceiver, and the microphone receives voice input that the cellular radio transceiver transmits. The mechanical coupling retains the first electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
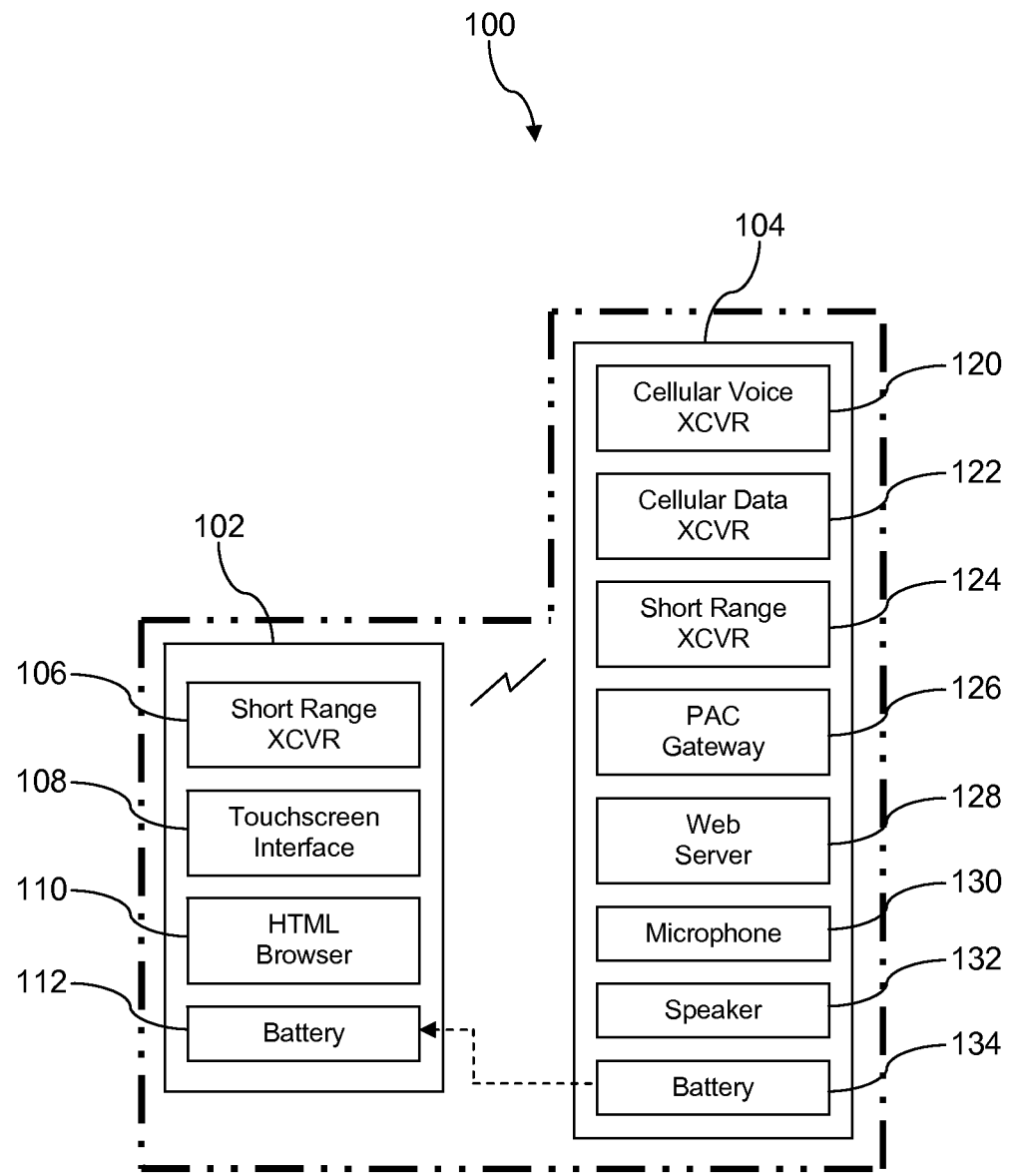
FIG. 1 is a block diagram of coupled communication devices according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a first electronic device may be mechanically coupled to a second electronic device, for example a handset may be slipped inside of or clipped to a companion handset. Alternatively, the first and second electronic devices may be placed in proximity to each other. The first electronic device and the second electronic device may communicate via short range radio communications, and the second electronic device may promote long range communications. The first electronic device may have a short range radio transceiver but lack a long range radio transceiver. For example, a handset may have a WiFi radio transceiver and/or a BlueTooth radio transceiver but may lack a cellular radio transceiver, and a companion handset may have one or more short range radio transceivers as well as one or more long range radio transceivers. For example, the companion handset may have a WiFi radio transceiver and/or a BlueTooth radio transceiver as well as one or more cellular radio transceivers. In an embodiment, the companion handset may originate a voice call via the long range radio transceiver in response to the handset providing dialed digits to the companion handset via short range radio communication. The companion handset also may access and/or transmit data via the long range radio transceiver, for example media content, in response to the handset providing a universal reference locator (URL) to the companion handset via short range radio communication.

After the first electronic device and the second electronic device are mechanically coupled, or otherwise brought into proximity to each other, when a browser on the first electronic device is actuated to retrieve content from an external content source, an application on the second electronic device may intercept the content request. In response to interception, the application on the second electronic device may transmit content to the first electronic device that causes a dialog box to display on the first electronic device that invites the user of the first electronic device to click to install a shortcut on an interface of the first electronic device, for example a touch screen. The shortcut, when selected by the user of the first electronic device, retrieves and presents content from a web server on the second electronic device. The content comprises a dialer interface that is implemented, for example, with asynchronous JavaScript and XML (AJAX) or other active web content. The dialer may be presented on the touch screen or other display of the first electronic device.

When the user of the first electronic device touches digits on the displayed dialer, the digits are transmitted by, for example, JavaScript to the web server on the second electronic device via the short range radio transceiver. The web server on the second electronic device translates the digits to AT commands and sends the AT commands to the long range radio transceiver to originate a voice call, for example over a code division multiple access one times radio transmission technology (1xRTT) wireless link. Likewise, when the user of the first electronic device selects a universal reference locator to access content, the reference is transmitted by, for example, JavaScript to the web server on the second electronic device via the short range radio transceiver. The web server mediates the request to access content to a data session via the long range radio transceiver.

The second electronic device may comprise a speaker and/or microphone for hearing voice communication from a called party and for transmitting voice communication to the called party. The second electronic device may alert when a call is coming in to the second electronic device, for example, by sounding an aural alert, vibrating, and/or presenting a visual alert. The second electronic device also may alert when a voice message is stored in a voice mail message box. The voice mail message may be stored in a communications network, for example on a voice mail data store, or on the second electronic device. The call may be accepted by pressing a button on the second electronic device. Alternatively, in response to the incoming call, the second device may trigger the first device to pull down the dialer interface from the web server on the second electronic device, and the user may accept the call by selecting an answer button of the dialer interface presented on the first electronic device.

Turning now to FIG. 1, a communication device 100 is described. The communication device 100 comprises a first electronic device 102 and a second electronic device 104. The electronic devices 102, 104 may be mechanically coupled together or placed into proximity to one another. For example, the second electronic device 104 may mechanically couple to the first electronic device 102 using a flexible sleeve that at least partially surrounds the first electronic device 102, for example a flexible plastic sleeve. The second electronic device 104 may comprise a housing that is configured to receive and hold the first electronic device 102, for example a recess into which the first electronic device 102 may be positioned and held in place by a friction fit, a snap fit, or other. In an embodiment, the first electronic device 102 may comprise a first short range radio transceiver 106, a touch screen interface 108, a hyper text mark-up language (HTML) browser 110, and a first battery 112. The first short range radio transceiver 106, for example, may be a WiFi radio transceiver or a BlueTooth radio transceiver. It is understood that the first electronic device 102 may vary somewhat from its depiction in FIG. 1. For example, the first electronic device 102 may have an additional short range radio transceiver (not shown). The first electronic device 102 may have an interface other than a touch screen interface. The first electronic device 102 may have a content access application other than a hyper text mark-up language browser. In an embodiment, the first electronic device 102 may have a long range radio transceiver. It is understood that the first electronic device 102 may comprise additional components that are not shown to avoid unnecessarily cluttering FIG. 1.

The second electronic device 104 may comprise a first long range radio transceiver 120, a second long range radio transceiver 122, a second short range radio transceiver 124, a public access control (PAC) gateway application 126, a web server application 128, a microphone 130, a speaker 132, and a second battery 134. The first long range radio transceiver 120 may be a cellular voice radio transceiver that promotes voice communication according to one or more of a code division multiple access (CDMA) wireless protocol, a global system for mobile communication (GSM) wireless protocol, a long-term evolution (LTE) wireless protocol, a worldwide interoperability for microwave access (WiMAX) wireless protocol, or the like wireless protocol. The second long range radio transceiver 120 may be a cellular data radio transceiver that promotes data communication according to one or more of the wireless protocols identified above. In an embodiment, the first long range radio transceiver 120 may promote voice communication according to a 1xRTT wireless protocol and an IS-41 signaling protocol, and the second long range radio transceiver 122 may promote data communication according to a code division multiple access evolution data only revision A (CDMA EVDOrA) wireless protocol.

Alternatively, in an embodiment, the first long range radio transceiver 120 may promote both voice communication and data communication according to a 1xRTT wireless protocol, and in this embodiment the second long range radio transceiver 122 may be omitted from the second electronic device 104. The voice communication as well as the data communication over a 1xRTT wireless link may be supported in the network by the IS-41 communication protocol. As is known to those of skill in the art, the IS-41 is a mobile and/or cellular telecommunication system standard that supports management of mobile communications based on networking of circuit switches. IS-41 coordinates among circuit switches in support of handoff and roaming mobility functions. In some contexts herein, and by consequence of the involvement at least of IS-41 signaling, 1xRTT voice calls and/or data calls may be referred to as circuit switched calls.

It is understood that the second electronic device 104 may vary somewhat from its depiction in FIG. 1. For example, the second electronic device 104 may have a single long range radio transceiver instead of two long range radio transceivers. The second electronic device 104 may comprise two short range radio transceivers, for example both a WiFi radio transceiver and a BlueTooth radio transceiver. It is understood that the second electronic device 104 may comprise additional components that are not shown to avoid unnecessarily cluttering FIG. 1.

In an embodiment, the first electronic device 102 and the second electronic device 104 may be held and operated by a user as an integrated unit and/or assembly. It is contemplated, however, that the first electronic device 102 and the second electronic device 104 may be sold and/or distributed separately. Additionally, the first electronic device 102 may be operated independently of the second electronic device 104, although the first electronic device 102 may lack voice communication capability in the absence of the second electronic device 104. Further, some of the functionality described below may be provided when the first electronic device 102 and the second electronic device 104 are separated but in proximity to each other, for example when the first electronic device 102 is close enough to the second electronic device 104 that the first short range radio transceiver 106 and the second short range radio transceiver 124 are able to establish a radio link with each other. In an embodiment, there may be a coupling between the first battery 112 of the first electronic device 102 and the second battery 134 of the second electronic device 104, whereby the second battery 134 may provide supplemental power to the first battery 112 and/or to the first electronic device 102. In an embodiment, the second battery 134 may be coupled to the first electronic device 102 in such a way as to provide power for recharging the first battery 112 and/or powering the first electronic device 102. It is understood that the second battery 134 continues to provide power to the second electronic device 104.

The first time the browser 110 transmits a request to access content via the first short range radio transceiver 106 while the first electronic device 102 is coupled or proximate to the second electronic device 104, the second short range radio transceiver 124 receives the transmission of the first short range radio transceiver 106, and the PAC gateway 126 intercepts the content request. In response to intercepting the content request, the PAC gateway 126 transmits a dialer shortcut initializer content via the second short range radio transceiver 124 to the first short range radio transceiver 106, and the browser 110 displays the dialer shortcut initializer content, for example on the touch screen interface 108. The dialer shortcut initializer content may comprise hyper text mark-up language comprising active instructions. The dialer shortcut initializer content, when displayed, may invite a user of the first electronic device 102 to click a control button to install a dialer shortcut to a dialer and/or web dialer on the touch screen interface 108. Later content access requests transmitted by the first short range radio transceiver 106 also may be intercepted and a dialer shortcut initializer content may be transmitted to the first electronic device 102, for example when the second electronic device 104 detects that the shortcut has been removed or lost from the first electronic device 102, when the second electronic device 104 is powered on, when the second electronic device 104 detects that the first electronic device 102 has powered on, on a periodic basis, or under other circumstances.

When the dialer shortcut is installed on the touch screen interface 108, when the user of the first electronic device 102 actuates the dialer shortcut, the web browser 110 sends a message to the web server 128 via the first short range radio transceiver 106 and the second short range radio transceiver 124 requesting a dialer be displayed on the touch screen interface 108. When the dialer is displayed and when the user actuates a dialer button, the dialer sends a message indicating the actuated dialer button via the short range radio transceivers 106, 124 to the web server 128. The web server 128 translates the indication of the actuated dialer button to an AT command and sends the AT command to the first long range radio transceiver 120 to provide a dialed digit. After a succession of dialed digits are provided to the first long range radio transceiver 120 in this way, the first long range radio transceiver 120 may originate a voice call to a called party. When the call is established, two-way communication on the call may be supported by the second electronic device 104, for example by receiving voice audio from the microphone 130, encoding this audio, transmitting this audio as a wireless signal and by receiving audio from the called party, decoding this audio, and playing back the audio over the speaker 132. In an embodiment, the second electronic device 104 may trigger the first electronic device 102 to actuate the dialer shortcut, for example when a call to the second electronic device 104 is originated.

When a call to the second electronic device 104 is originated, the second electronic device 104 may alert about the incoming call by sounding an audio alert, by vibrating, or by presenting a visual alert. The incoming call alert may comprise one or more customized or selected ring tones stored and/or configured on the second electronic device 104. The call may be received by pressing a call receive button on the second electronic device 104.

Alternatively, the incoming call may be received by actuating the dialer shortcut on the first electronic device 102, the hyper text markup language browser 110 may request a dialer interface from the web server 128, a dialer interface may be returned to the hyper text markup language browser 110, and the dialer interface may be presented on the first electronic device 102. The dialer interface may provide controls for answering an incoming phone call, transferring the phone call, for example to voice mail or other destination, and/or for terminating a phone call as well as controls for inputting dialed digits.

Alternatively, in an embodiment, the dialer interface may remain active on the first electronic device 102, for example in a reduced display size or in a minimized size, substantially continuously. The dialer interface may execute logic that periodically polls the second electronic device 104 to determine if an incoming call is pending an answer. The dialer interface may automatically time-out after a period of inactivity, for example after a period of time when no user inputs to the controls of the dialer interface have been received, and upon time-out redraw or re-render itself in a reduced display size. Additionally, after the time out, the dialer interface may put itself to sleep or make itself dormant for a period of time to avoid burdening the processor of the first electronic device 102. The dialer interface logic may provide for periodically reawakening to poll the second electronic device 104 about any pending calls. The dialer interface logic likewise poll the second electronic device 104 about pending voice mail messages and may pop the dialer interface to promote calling to retrieve voice mail.

In an embodiment, when a voice message is pending in a voice message storage box, for example stored in a data store coupled to a voice mail server, an alert may be sent to the second electronic device 104, and the second electronic device 104 may alert about the pending voice message by sounding an audio alert, by vibrating, or by presenting a visual alert. The alerts associated with a pending voice message may be distinct from the alerts associated with an incoming voice call. By actuating the dialer shortcut on the first electronic device 102, the hyper text markup language browser 110 may request a dialer interface from the web server 128, a dialer interface may be returned to the hyper text markup language browser 110, and the dialer interface may be presented on the first electronic device 102. The dialer interface may provide controls for calling to a voice mail server to retrieve pending voice messages and to perform other actions related to voice mail, for example voice mailbox housekeeping tasks, replaying stored voice messages, and other actions.

In an embodiment, the dialer interface may provide controls for entering a universal reference locator and retrieving content via the web server 128 of the second electronic device 104. The web server 128 may retrieve the requested content via the cellular data transceiver 122. In some circumstances, data services provided over the wireless link provided by the cellular data transceiver 122 may provide higher speed data communication than data services provided over the wireless link provided by the first short range radio transceiver 106 of the first electronic device 102 and/or by a long range radio transceiver of the first electronic device 102. The dialer interface further may provide access to controls to add contacts to an address book and to originate calls based on the address book. The contact information may be stored in a memory of the second electronic device.

Figure 2:
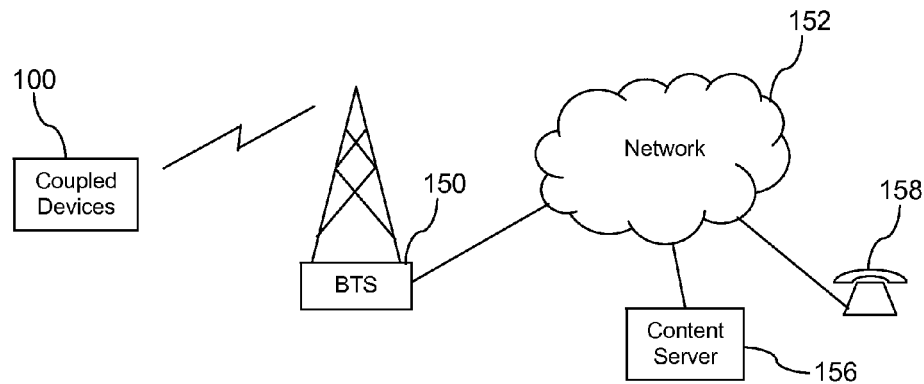
FIG. 2 is a block diagram of a communication system according to an embodiment of the disclosure.

Turning now to FIG. 2, a communication system is described. The communication device 100, comprising the first electronic device 102 and the second electronic device 104, may establish a wireless link with a base transceiver station (BTS) 150, for example the first long range radio transceiver 120 and/or the second long range radio transceiver 122 of the second electronic device 104 may establish a wireless link with the base transceiver station 150. The base transceiver station 150 may couple the communication device 100 into the network 152. The network 152 may comprise a public voice communication network, a public data network, a private network, or a combination thereof. The network 152 may promote coupling the communication device 100 to a content server 156 for downloading content to the communication device 100 and/or uploading content from the communication device 100 to the content server 156. The network 152 may promote coupling the communication device 100 to a voice mail server and/or voice message mailbox. The network 152 may promote establishing voice calls between the communication device 100 and a telephone 158. While illustrated in FIG. 2 as a land-line phone, it is understood that the telephone 158 also may be a mobile phone. To receive wireless communication services via the base transceiver station 150, it may be necessary for the communication device 100 to be provisioned for wireless service, for example in association with a wireless subscription account. In an embodiment, the second electronic device 104 may be provisioned for wireless communication service.

Figure 3:
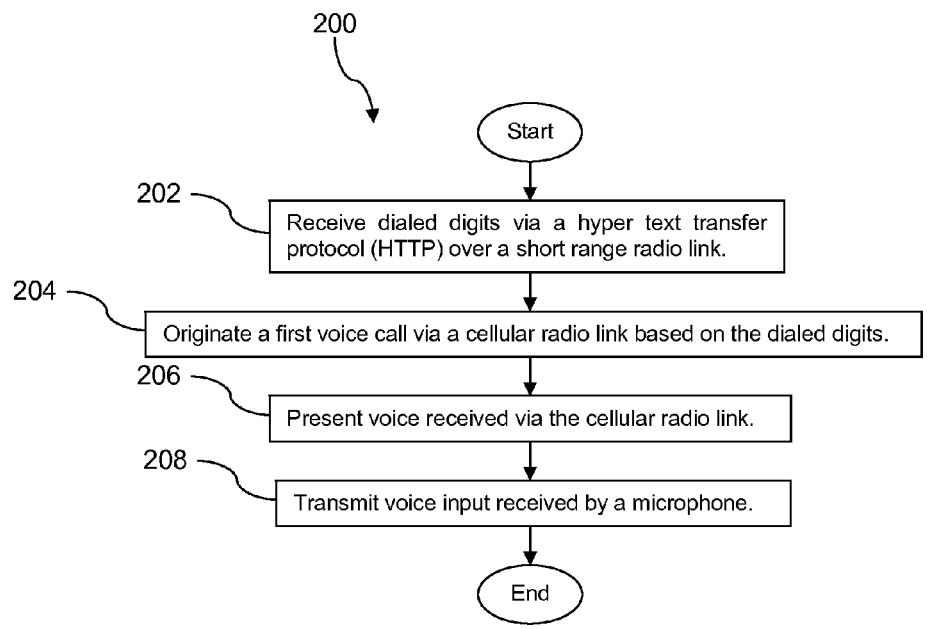
FIG. 3 is a flow chart of a method according to an embodiment of the disclosure.

Turning now to FIG. 3, a method 200 is described. At block 202, dialed digits are received via a hyper text transfer protocol (HTTP) over a short range radio link, for example via a radio link established between the first short range radio transceiver 106 of the first electronic device 102 and the second short range radio transceiver 124 of the second electronic deice 104. At block 204, a first voice call is originated via a cellular link based on the dialed digits. For example, the hyper text markup language browser 110 on the first electronic device sends dialed digits to the web server 128 on the second electronic device 104; the web server 128 translates the dialed digits to AT commands and sends the AT commands to the first long range radio transceiver 120 of the second electronic device 104; and the first long range radio transceiver 120 generates a voice call origination message based on the sequence of dialed digits received via AT commands.

At block 206, voice which is received via a cellular radio link is presented. For example, voice is played back through the speaker 132 of the second electronic device 104. At block 208, voice which is received by the microphone 130 of the second electronic device 104 is transmitted. For example, the voice is received by the microphone 130; the voice signal is encoded by a processor of the second electronic device 104; the encoded voice signal is modulated as a radio frequency signal by the first cellular radio transceiver 120 and transmitted to the base transceiver station 150 for distribution to the telephone 158.

Figure 4:
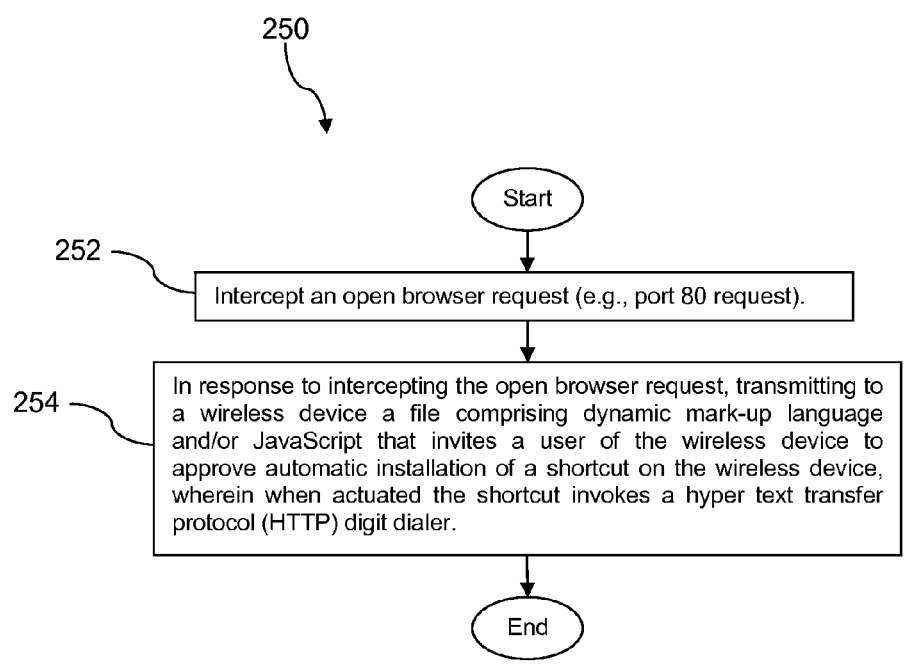
FIG. 4 is a flow chart of a method according to an embodiment of the disclosure.

Turning now to FIG. 4, a method 250 is described. At block 252, an open browser request is intercepted. For example, a port 80 request is detected by the web server 128. At block 254, in response to intercepting the open browser request, a file comprising a dynamic mark-up language and/or JavaScript is transmitted to a wireless device, for example transmitted from the second short range transceiver 124 of the second electronic device 104 to the first short range transceiver 106 of the first electronic device 102. The file, when rendered by the wireless device, for example when rendered by the hyper text markup language browser 110, invites a user of the wireless device to approve automatic installation of a shortcut on the wireless device wherein when the shortcut is actuated, the shortcut invokes a hyper text transfer protocol (HTTP) digit dialer. For example, when the shortcut is actuated, a request is sent from the hyper text markup language browser 110 on the first electronic device 102 via the first short range radio transceiver 106 to the web server 128 on the second electronic device 104 via the second short range radio transceiver 124. Alternatively, in an embodiment, the file, when rendered by the wireless device, may invite the user of the wireless device to approve automatic installation of a digit dialer application on the wireless device wherein when the application is invoked, a digit dialer is displayed on the first device.

In response to the request, the web server 128 returns a dialer content to the hyper text markup language browser 110 via the radio link between the second short range radio transceiver 124 and the first short range radio transceiver 106. The dialer content, when rendered by the first electronic device 102, for example when rendered by the hyper text markup language browser 110, provides a dialer interface having controls for entering dialed digits. When digits are entered into the dialer interface, for example using a touch screen interface of the first electronic device 102, the hyper text markup language browser 110 transmits the dialed digits to the web server 128 on the second electronic device via the radio link between the first short range radio transceiver 106 and the second short range radio transceiver 124. Alternatively, the web server 128 may return a dialer application that provides similar function to the first electronic device 102. It is understood that method 250 may be used in combination with method 200 described above with reference to FIG. 3. In an embodiment, method 250 may be executed a first time that the first electronic device 102 is brought into proximity of the second electronic device 104. Once the dialer shortcut is installed on the first electronic device 102, it may not provide any utility to again execute method 250. Alternatively, the method 250 may be executed when the dialer icon is detected to be missing from the first electronic device 102. Additionally, in an embodiment, the method 250 may be executed on the event of the power on of the second electronic device 104. In an embodiment, the method 250 may be executed on the event of the first electronic device 102 powering on. The method 250 may be executed periodically, for example once per day or once per week.

Figure 5:
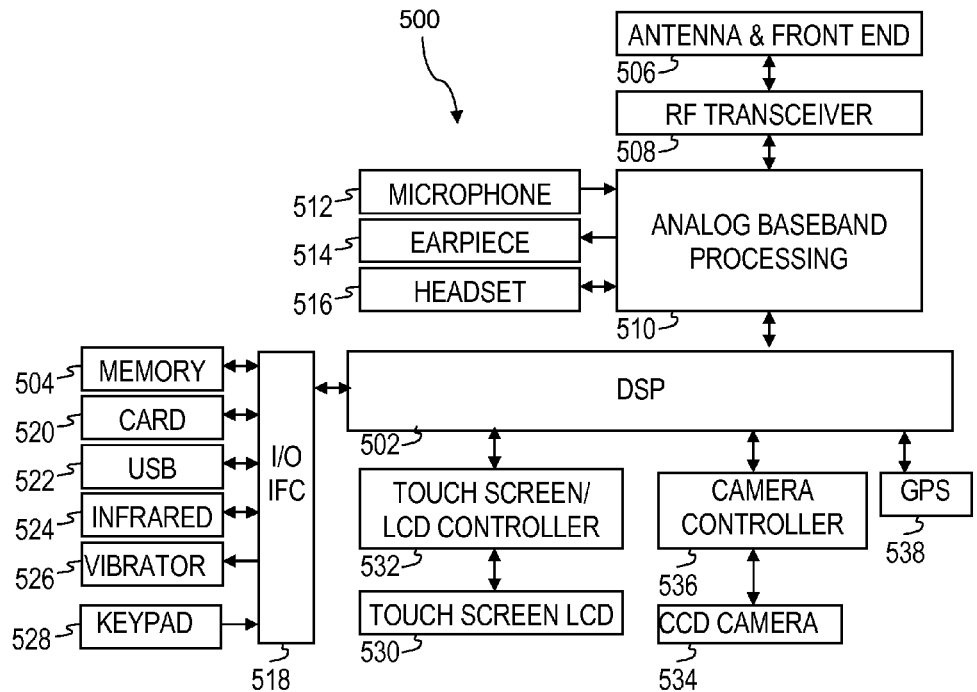
FIG. 5 is a block diagram of a communication device according to an embodiment of the disclosure.

FIG. 5 shows a block diagram of a handset 500. In an embodiment, the first electronic device 102 may be similar to the handset 500. In an embodiment, the second electronic device 104 may share some, but not all, of the components of the handset 500 illustrated in FIG. 5. The handset 500 includes a digital signal processor (DSP) 502 and a memory 504. As shown, the handset 500 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 500 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 500 to send and receive information from a radio access network (RAN) or some other available wireless communications network or from a peer handset 500. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 500 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 500 to function as a peripheral device to exchange information with a personal computer or other computer system. The infrared port 524 and other optional ports such as a Bluetooth interface or an IEEE 802.11 compliant wireless interface may enable the handset 500 to communicate wirelessly with other nearby handsets and/or wireless base stations.

The input/output interface 518 may further connect the DSP 502 to the vibrator 526 that, when triggered, causes the handset 500 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 500. Another input mechanism may be the touch screen LCD 530, which may also display text and/or graphics to the user. The touch screen LCD controller 532 couples the DSP 502 to the touch screen LCD 530.

The CCD camera 534 enables the handset 500 to take digital pictures. The DSP 502 communicates with the CCD camera 534 via the camera controller 536. The GPS sensor 538 is coupled to the DSP 502 to decode global positioning system signals, thereby enabling the handset 500 to determine its position. In another embodiment, a camera operating according to a technology other than charge coupled device cameras may be employed. Various other peripherals may also be included to provide additional functions, e.g., radio and television reception.

Figure 6:
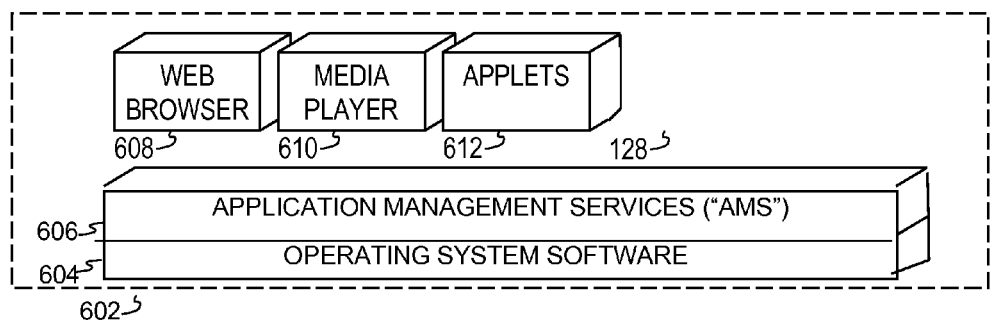
FIG. 6 is a block diagram of a software architecture of a communication device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the handset 500. Also shown in FIG. 6 are a web browser application 608, a media player application 610, JAVA applets 612, and the web server 128. The web browser application 608 configures the handset 500 to operate as a web browser, allowing a user to enter information into forms and select links to retrieve and view web pages. The media player application 610 configures the handset 500 to retrieve and play audio or audiovisual media. The JAVA applets 612 configure the handset 500 to provide games, utilities, and other functionality.

Figure 7:
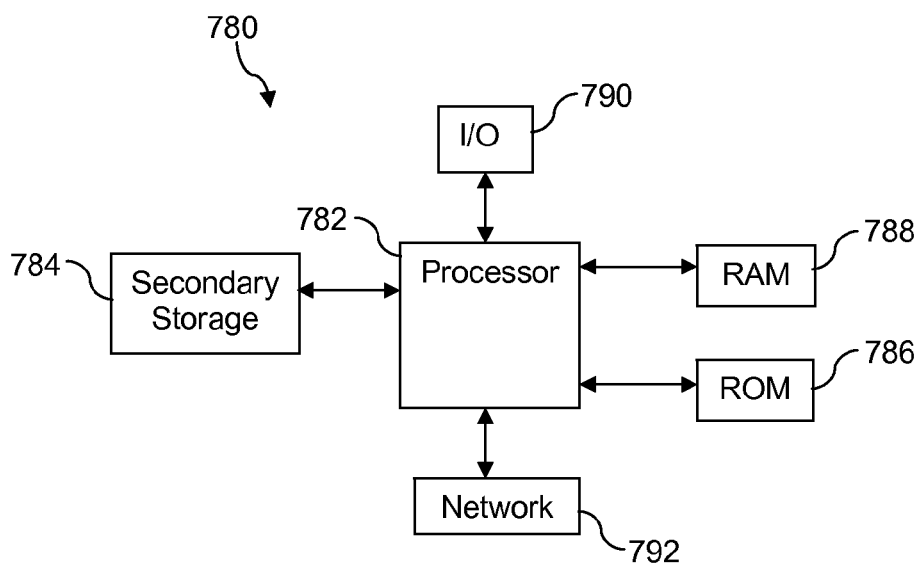
FIG. 7 is a block diagram of a computer system according to an embodiment of the disclosure.

FIG. 7 illustrates a computer system 780 suitable for implementing one or more embodiments disclosed herein. For example, the content server 156 and/or the mail server discussed above may be implemented as a computer system. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as non-transitory storage and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication device, comprising:
a short range radio transceiver;
a cellular radio transceiver;
a speaker;
a microphone;
the communication device configured to intercept a content request from an other device proximate to the communication device and transmit a dialer shortcut initializer content via the short range radio transceiver in response to intercepting the content request;
the short range radio transceiver configured to wirelessly receive dialed digits in a message from the dialer shortcut on the other device;
the communication device further configured to establish a voice call via the cellular radio transceiver based on the dialed digits;
the cellular radio transceiver configured to transmit voice received from the microphone; and
the communication device further configured to present voice received via the cellular radio transceiver over the speaker.

2. The communication device of claim 1, wherein the cellular radio transceiver is further configured to establish the voice call using at least one of a code division multiple access (CDMA) wireless protocol, a global system for mobile communication (GSM) wireless protocol, a long term evolution (LTE) wireless protocol, and a worldwide interoperability for microwave access (WiMAX) wireless protocol.

3. The communication device of claim 1, wherein the communication device is further configured to receive a designation of content via the short range radio transceiver, in response to receiving the designation of content establish a data session and download the content via the cellular radio transceiver, and transmit the content to the other device via the short range radio transceiver.

4. The communication device of claim 3, wherein the cellular radio transceiver is further configured to establish the data session and download the content using one of a one times Code Division Multiple Access (CDMA) Radio Transmission Technology (1xRTT) wireless protocol or a Code Division Multiple Access Evolution Data Only (EVDO) wireless protocol.

5. The communication device of claim 1, wherein the communication device further comprises a mechanical coupling for receiving the other device having a short range radio transceiver, promoting handling of the combination of the communication device and the other device as a united structure.

6. The communication device of claim 5, wherein the mechanical coupling is configured to provide access to a touch screen interface of the other device.

7. The communication device of claim 1, wherein the communication device is further configured to present notification of a pending stored message.

8. The communication device of claim 1, wherein the communication device is further configured to host a web server that provides an asynchronous Java Script and XML (AJAX) dialer script via the short range radio transceiver.

9. The communication device of claim 1, wherein the voice call established by the communication device is a circuit switched voice call.

10. The communication device of claim 9, wherein the voice call is established by the cellular radio transceiver in accordance with a code division multiple access (CDMA) 1 times radio transmission technology (1xRTT).

11. A method of communication, comprising:
intercepting, by a communication device, a content request from an other device proximate to the communication device;
transmitting, by the communication device, a dialer shortcut initializer content over a short range radio link;
receiving, by the communication device, dialed digits via a hyper text transfer protocol associated with the dialer shortcut over the short range radio link from the other device;
originating, by the communication device, a voice call via a cellular radio link based on the dialed digits;
presenting, by the communication device, voice received via the cellular radio link; and
transmitting, by the communication device, voice input received by a microphone.

12. The method of claim 11, further comprising:
receiving, by the communication device, a designation of a content over the short range radio link;
establishing, by the communication device, a data session via the cellular radio link based on the designation of the content;
downloading, by the communication device, the content via the data session over the cellular radio link; and
transmitting, by the communication device, the content over the short range radio link.

13. The method of claim 11, wherein originating the voice call via the cellular radio link comprises establishing, by the communication device, a wireless communication link using one of a code division multiple access (CDMA) wireless protocol, a global system for mobile communication (GSM) wireless protocol, a long term evolution (LTE) wireless protocol, or a worldwide interoperability for microwave access (WiMAX) wireless protocol.

14. The method of claim 11, further comprising:
receiving, by the communication device, an indication of a stored voice message via the cellular radio link; and
presenting, by the communication device, a notification of a stored voice message.

15. The method of claim 11, further comprising translating, by the communication device, the dialed digits to AT commands and transmitting the AT commands generated by an asynchronous JavaScript and XML (AJAX) script to a cellular radio, whereby the voice call is originated via the cellular radio link.

16. A communication system, comprising:
a first electronic device comprising:
a first short range radio transceiver and
an input device,
the input device configured to receive a designation of a phone number and the first short range radio transceiver configured to transmit the phone number;
a second electronic device comprising:
a second short range radio transceiver,
a cellular radio transceiver,
a speaker,
a microphone,
a mechanical coupling;
the second short range radio transceiver configured to receive the phone number transmitted by the first short range radio transceiver, the cellular radio transceiver configured to transmit signaling to establish a phone call to the phone number, the speaker configured to present voice received by the cellular radio transceiver, the microphone configured to receive voice input that the cellular radio transceiver transmits, and the mechanical coupling configured to retain the first electronic device; and
the first electronic device configured to receive a hyper text transport protocol (HTTP) dialer from the second electronic device via the first short range radio transceiver.

17. The system of claim 16, wherein the hyper text transport protocol dialer executes on the first electronic device and uses asynchronous JavaScript and XML (AJAX) to send digit press signals to a web server application executing on the second electronic device and wherein the web server application generates AT commands based on the digit press signals and transmits the AT commands to the cellular radio transceiver.

18. The system of claim 17, wherein the cellular radio transceiver is further configured to establish a wireless communication link using one of a code division multiple access (CDMA) wireless protocol, a global system for mobile communication (GSM) wireless protocol, a long term evolution (LTE) wireless protocol, or a worldwide interoperability for microwave access (WiMAX) wireless protocol.

* * * * *